United States Patent [19]

Ghose

[11] Patent Number: 5,172,282
[45] Date of Patent: Dec. 15, 1992

[54] SINGLE MOTOR DATA STORAGE DEVICE UTILIZING CENTRIFUGAL FORCE AND COUNTERACTING SPRING

[75] Inventor: Sanjoy Ghose, Santa Cruz County

[73] Assignee: Seagate Technology, Inc., Scotts Valley, Calif.

[21] Appl. No.: 546,513

[22] Filed: Jun. 29, 1990

[51] Int. Cl.$^5$ .................. G11B 5/54; G11B 21/08; G11B 25/04
[52] U.S. Cl. .................. 360/78.12; 360/77.07; 360/101; 360/106; 360/2; 369/177
[58] Field of Search ............... 235/449, 454, 475, 476, 235/486; 369/30, 31, 32, 35, 65, 93, 98, 177, 14; 360/75, 2, 77.01, 77.08, 78.01, 78.04, 78.12, 81, 86, 101, 105–107, 77.07

[56] References Cited

U.S. PATENT DOCUMENTS

| | | | |
|---|---|---|---|
| 3,633,186 | 1/1972 | Lynott et al. | 360/101 |
| 4,114,181 | 9/1978 | Itoh | 360/2 |
| 4,706,142 | 11/1987 | Hattori et al. | 360/105 |
| 4,851,929 | 7/1989 | Yang | 360/101 |

OTHER PUBLICATIONS

IBM TDB vol. 30, No. 7 "Compact Diskette Drive" Dec. 1987, pp. 448–451.

Primary Examiner—Jerry Smith
Assistant Examiner—Steven R. Garland
Attorney, Agent, or Firm—Flehr, Hohbach, Test, Albritton & Herbert

[57] ABSTRACT

The present invention proposes a memory device comprising a fixed disc on the surface of which data may be stored, and rotating transducers or heads which may be positioned to access any location on the disc. The rotating heads are mounted on transducer arms which are designed in such a manner that the transducer seeks outward as it is rotated. That is, similar to a flywheel governor in a steam engine, centrifugal force would impart a radial force on the arm which is movable in a low friction system along with the transducer, the radial force causing the transducer to move outward together with the radial arm with increasing rotational speed of the spindle motor. A counteracting spring having a force in a direction opposite to the radial force would provide a radially inward force on the transducer arm, so that at any given speed the location of the transducer and the arm, and therefore the transducer's positional relationship to a desired track, is precisely determined by the balance of the inwardly acting spring force and the outwardly driving centrifugal force.

27 Claims, 3 Drawing Sheets

SINGLE MOTOR DATA STORAGE DEVICE UTILIZING CENTRIFUGAL FORCE AND COUNTERACTING SPRING

FIELD OF THE INVENTION

The present invention is directed to the field of data storage, and more particularly to a low cost data storage utilizing a single motor, a single actuator, and a single control circuit.

BACKGROUND OF THE INVENTION

All disc drives today require two precision moving parts and two motors, one for driving the actuator to position the transducer relative to the rotating disc, and a second motor to rotate the disc at a constant speed. Associated control circuitry is required for each of the motors. Substantial cost reduction is possible if a drive could be built with only one moving part or assembly. Theoretically, the cost of the mechanism and control electronics could be reduced as much as 50 percent.

All current hard disc drives have one or more rotating discs mounted on a precision spindle motor which runs at a constant speed. The data on the surface of the disc is stored in circular, concentric tracks, and is accessed using a transducer mounted on an actuator arm. The actuator arm is controlled in either linear or rotary fashion to access any location on the concentric tracks.

The actuator is controlled to maintain the transducer over the desired track location by open or closed loop servo techniques.

Typically, the transducer head is parked on power down in a landing zone, or unloaded off the disc.

The objective in the present invention is to eliminate the need for separate motors for the spindle rotation and actuator positioning, thereby reducing the parts count and the basic material costs in the disc drive.

SUMMARY OF THE INVENTION

Briefly described, the present invention proposes a memory device comprising a fixed disc on the surface of which data may be stored, and rotating transducers or heads which may be positioned to access any location on the disc. The rotating heads are mounted on transducer arms which are designed in such a manner that the transducer seeks inward and outward as its rotational speed is decreased or increased. That is, similar to a flywheel governor in a steam engine, centrifugal force would impart a radial force on the arm which is movable in a low friction system along with the transducer, the radial force causing the transducer to move outward together with the radial arm with increasing rotational speed of the spindle motor.

A counteracting spring having a force in a direction opposite to the radial force would provide a radially inward force on the transducer arm, so that at any given speed the location of the transducer and the arm, and therefore the transducer's positional relationship to a desired track, is precisely determined by the balance of the inwardly acting spring force and the outwardly driving centrifugal force.

DETAILED DESCRIPTION OF A PREFERRED EMBODIMENT

Figure 1:
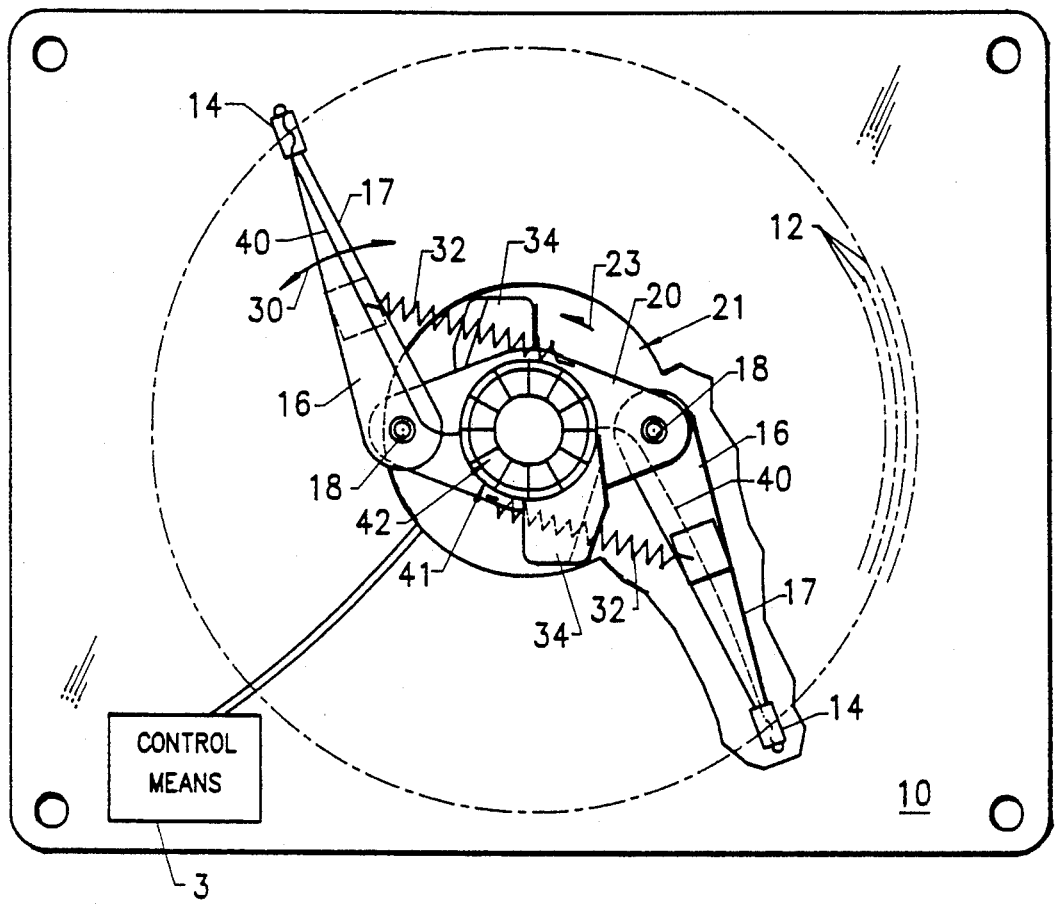
FIG. 1 is a top plan view of the essential elements of a drive designed in accordance with the present invention.

Referring first to FIG. 1, the major elements of the disc drive as they apply especially to this invention are shown including a stationary disc or other magnetic recording medium 10, having a plurality of circumferential tracks 12 written thereon. As with presently known disc drive systems, the data is stored in addressable locations along the tracks 12. However, in the disc drive which is the subject of this invention, the magnetic medium is stationary and the transducers for accessing the data are movable over the magnetic recording surface.

The transducers 14 are mounted on the ends of head arms 16. Although in this embodiment a pair of head-arm combinations 14, 16 are shown, a single arm could be used if appropriately balanced. Alternatively, the bearings and spring can be replaced by flexures which support the head arms.

Figure 2:
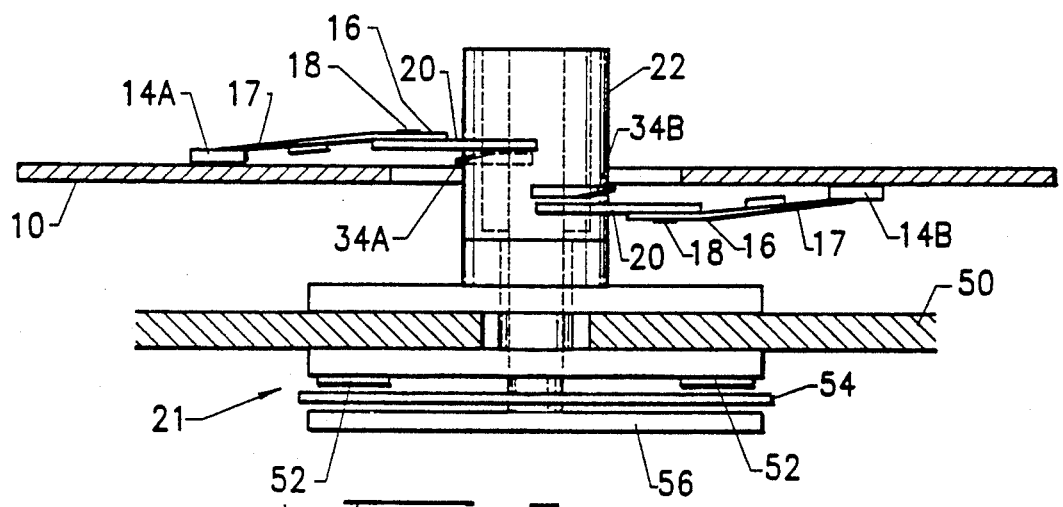
FIG. 2 illustrates the actuator arm and transducer positioning scheme of the present invention.
Figure 3:
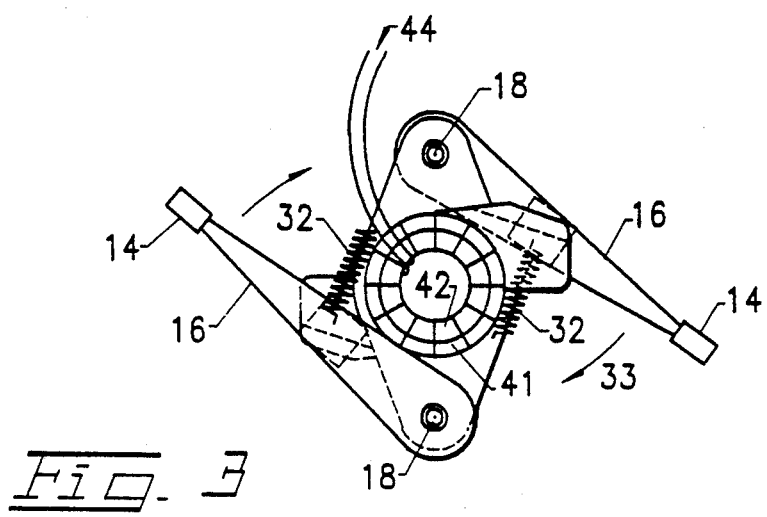
FIG. 3 is a vertical sectional view through the disc support and rotary arm support.

The heads and arms 16 are freely movable about bearings 18 mounted on a supporting plate 20 which is rotated at a controlled rate of rotation by a motor 21 which is shown in FIG. 2. The motor 21 drives a shaft 22 to which the head arm support plate 20 is fixed. The speed of the motor 21 is controlled by commands from control means 3 comprising a microprocessor; the speed is selected as a function of the particular circumferential track which is to be accessed at any given time. The rotating heads and head arms are mounted on the bearings 18 in such a manner that the heads seek outward when plate 20 is rotated by motor 21 in the direction of arrow 23. That is, as is more readily apparent from a comparison of FIG. 1 which shows arms 16 in an unretracted position, and FIG. 3 which shows arms 16 in a retracted position, the system functions on principles similar to a flyball governor in a steam engine. The centrifugal force imparted by the motor 21 as it rotates the plate 20 imparts a radial force on each arm 16, causing it to move outward in the direction of arrow 30 with increasing rotational speed of the motor and plate.

A counteracting spring 32 attached to the plate 20 at one end and to the arm 16A, B at the other end applies a radially inward force to the arms 16 to constantly draw them back toward the plate 20 as indicated by arrows 23. At any given speed of the motor 21, the location of the head arm 16 and therefore the track over which the heads 14 are flying is precisely determined by the balance of the inwardly-acting spring force 33 and the outwardly-acting centrifugal force 30 created by the rotation of motor 21.

The retracting spring 32 also acts as a head unloading mechanism. On power down, the spring 32 pulls each of the flexures over a ramp 34 which is mounted immediately adjacent the inward edge of the magnetic recording surface, and is supported on the rotating head/arm flexure spindle mechanism. Referring again to FIG. 2, it can be seen that when the spring 32 is fully retracted, the arm 16 and headsupporting flexure 36 rest upon the ramp 34 so that the transducer does not rest on the magnetic recording surface. As the plate 20 rotates, the flexure and arm 16 move away from the ramp 34 so that the transducer 14 is flown at the correct height over the surface of the magnetic recording medium 10.

Figure 6A:
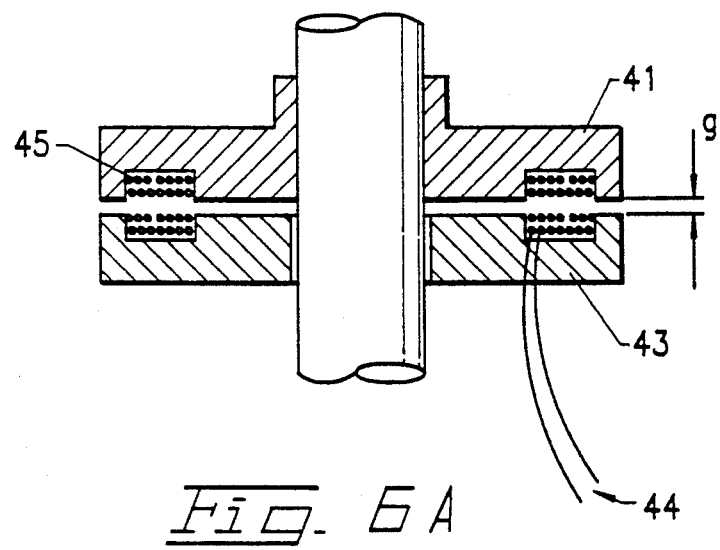
FIG. 6A is a cross-sectional view of an axial transformer to which the signals of the transducer are sent.
Figure 6B:
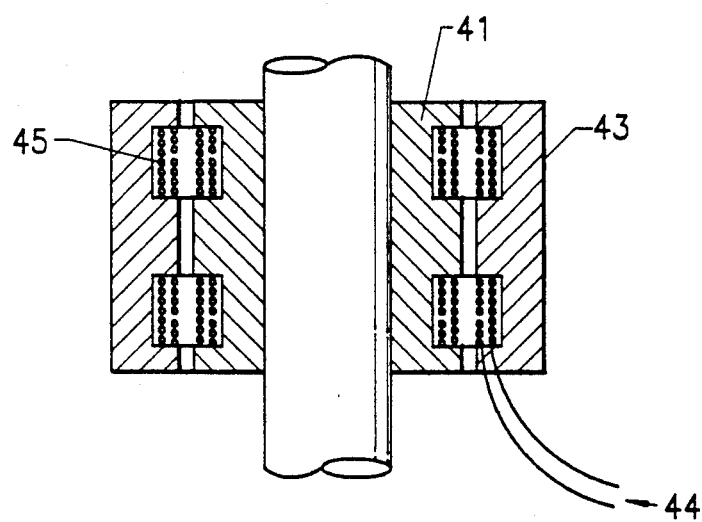
FIG. 6B is a cross-sectional view of a radial transformer to which the signals of the transducer are sent.

The signals from the transducer are carried on a wire 40 (FIG. 1) back to a rotary transformer 42 similar to the type used in present video cassette recorder technology and incorporated in the spindle at the center of the magnetic recording surface. The wire 40 leads to the primary side 41 which rotates with the plate 20. The signals as received at the stationary secondary side 43 can then be brought out (FIG. 3) to the external environment through leads 44 from the secondary side 43 of the transformer 42. Note that although the transfer shown herein is radial, an axial version may alternatively be used. Details of the axial (FIG. 6A) and radial (FIG. 6B) transformers show that each includes primary 41, secondary 43, leads 44, and coils 45, arranged as shown.

The vertical sectional view of FIG. 2 also shows that the proper balance in the disc drive having arms 16 on opposite ends of the support plate 20 may be facilitated by providing a first head 14A flying over the top surface of the stationary disc 10, and a second head 14B flying over the bottom surface. An appropriate unloading ramp and wedge 34A, 34B can be provided on opposite sides of the spindle 22 to support the flexure in its unloaded position.

FIG. 2 also illustrates the necessary support structure to support the magnetic recording medium 10, arms 16, flexure 17, and transducer 14 within a disc drive, including the base casting 50, and mounted below the base casting the necessary magnets 52, coil 54 and magnetic return 56 to form a variable speed spindle motor whose speed can be adjusted to define the speed of rotation of spindle 57 and thereby the radius of travel of the rotating heads. The spindle 22 rotated by the motor so defined extends up through the base casting 50 to support the rotating arms 16. Although an axial gap spindle motor is shown, any type of motor, radial gap, etc., can alternatively be used.

Figure 4:
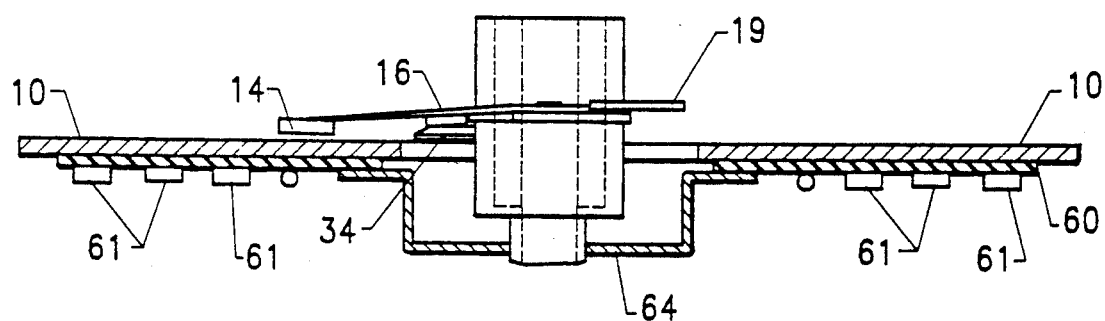
FIG. 4 is a view in vertical section of an alternative embodiment utilizing a single-sided disc with a laminated printed circuit board.

Referring to FIG. 4, an alternative embodiment which achieves further cost reduction is provided by a singlesided disc, with a single transducer 14 supported by arm 16 with a counter balance 19 on opposite sides of the support plate 20, but on the same side of the magnetic data storage media 10. A laminated fiberglass printed circuit board 60 could then be provided mounted immediately beneath the stationary magnetic recording medium, supporting the necessary components 61 to control the speed of rotation of the spindle motor, and therefore define the track being accessed by the transducers. In this embodiment, the housing 64 surrounds the base of the transformer 41, 42, with the shaft 22 extending down through this base plate to the motor (not shown).

The encoding scheme for the data would, of course, have to be DC-free, so that a zero modulation code needs to be used, similar to those used on rotating head tape drives.

Figure 5:
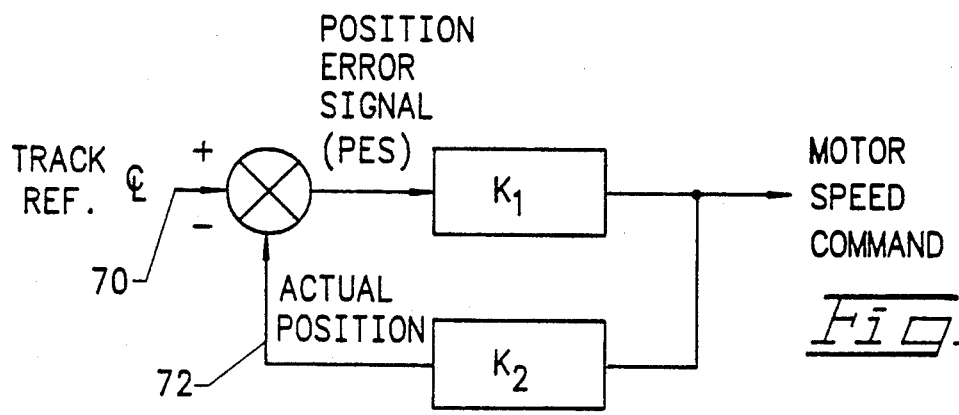
FIG. 5 is a block diagram of a track seeking and positioning servo system useful with the present invention.

The servo information, preferably sectored, is written on the tracks on the memory surface. The head/arm assembly will be rotated at a higher speed to seek to an outside track, and at lower speed to seek to an inner track with the servo information providing the necessary feedback signals to close on the target track. Referring to FIG. 5, where the input 70 is the track centerline reference signal and the feedback signal 72 is the actual position signal, then the constant K1, 74, contains gain terms to convert position error signal (PES) to command changes in motor rpm, and K2, 76, feeds back the actual position of the arm.

The magnetic recording medium 10 can be round or square, in the square mode having mounting holes at the edges thereof to be inexpensively mounted to the support structure. That is, the magnetic recording media would be sputtered onto the inside of the baseplate of the drive.

In summary, this disclosure details a disc drive with minimum moving parts, a single actuator and only one control circuit. Substantial cost reduction is possible with this scheme. It is recognized that the larger inertia and lower bandwidth of the servo scheme may restrict its application to slow access time drives. Nevertheless, in cost-sensitive applications, this approach provides significant benefits.

Alternatives to the present invention may become apparent to a person of skill in the art who studies the subject disclosure. Therefore, the scope of the invention is to be limited only by the following claims.

What is claimed is:

1. A memory device comprising:
   a base;
   a stationary disc coupled to said base, on which the surface of said stationary disc/data may be stored;
   a spindle rotatably coupled to said base;
   a transducer arm mounted on said spindle;
   a transducer mounted on said transducer arm;
   a motor drive means for rotating said spindle and for supporting said spindle so that said transducer is suspended near the surface of said stationary disk;
   said transducer arm responsive to said rotation so that said transducer arm moves outward from said spindle;
   a counteracting spring means coupled to said transducer arm and said spindle for counterbalancing the centrifugal force of said rotating transducer arm.

2. A memory device as claimed in claim 1 wherein said stationary disc is adapted to physically support elements of said memory device.

3. A memory device as claimed in claim 2 wherein said stationary disc includes holes, said memory device including elements supported by attachment elements fixed through said holes.

4. A memory device as claimed in claim 3 wherein said memory device includes a printed circuit board supported from said stationary disc.

5. A memory device as claimed in claim 4 including a housing enclosing at least a portion of the base of said memory device, said housing being attached directly to said stationary disc.

6. A memory device as claimed in claim 1 wherein said stationary disc surface includes data regions and regions where servo information is stored, said device including servo means for accessing said servo data and modulating said motor drive means speed to accurately position said transducer over said disc memory surface.

7. A memory device as claimed in claim 1 including a transformer having a first section mounted for rotation with said spindle and relative to a second section coupled to said spindle and fixed relative to said stationary disc and said base, said first section being electrically connected to said transducer so that data may be transferred to said second fixed section and thereby to an input/output region of said memory device.

8. A memory device as claimed in claim 7 wherein the primary and the secondary of said transformer are horizontally aligned so that the gap between said primary and said secondary is perpendicular to said spindle.

9. A memory device as claimed in claim 7 wherein the primary and the secondary of said transformer are vertically aligned so that the gap between said primary and said secondary is parallel to said spindle.

10. A memory device as claimed in claim 1 including a motor mounted below said stationary disc surface and having a spindle extending up to and through said storage surface, said transducer support arm being pivotally connected to said spindle so that as said spindle rotates, said transducer support arm pivots and moves said transducer over said stationary disc surface.

11. A memory device as claimed in claim 10 including a plate directly connected to said spindle for rotation therewith, said transducer support arm being pivotally connected to said plate for radial displacement of said transducer over said data surface.

12. A memory device as claimed in claim 11 including a support plate coupled to said spindle and a pair of said transducer support arms connected to opposite sides of said support plate, said arms accessing regions on a common radius of said data surface but 180° apart, whereby said arms are balanced and the rate of data access is doubled.

13. A memory device as claimed in claim 11 wherein said spring means further including a spring connected from said plate to said transducer arm, rotation of said spindle causing said arm to move away from said spindle toward data locations radially spaced from said spindle.

14. A memory device as claimed in claim 13 including a ramp mounted adjacent said spindle and having an inclined surface for supporting said arm as said spindle ceases rotating and said spring draws said arm pivotally and radially toward said spindle.

15. A memory device as claimed in claim 14 wherein said stationary disc surface includes data regions and regions where servo information is stored, said memory device including servo means for accessing said servo data and modulating said motor drive means speed to accurately position said transducer over said disc memory surface.

16. A memory device as claimed in claim 15 including a counteracting spring connected between the transducer arm and the spindle, the transducer seeking outward against the force of the spring.

17. A memory device as claimed in claim 16 wherein said stationary disc is adapted to physically support elements of said memory device.

18. A memory device as claimed in claim 17 wherein said memory device includes a printed circuit board supported from said stationary disc.

19. A memory device as claimed in claim 18 including a transformer having a first section mounted for rotation with said spindle and relative to a second section coupled to said spindle and fixed relative to said stationary disc and said base, said first section being electrically connected to said transducer so that data may be transferred to said second fixed section and thereby to an input/output region of said memory device.

20. A data storage device for storing data on radially separated concentric tracks on a planar surface, comprising
a housing including a planar base, upright sidewalls and a planar top together defining an enclosed environment for said data storage,
a fixed, non-moving data storage surface within said enclosed environment, said surface including a plurality of concentric data storage tracks defined thereon,
a rotating transducer which may be positioned to access locations on said data storage tracks, and
rotating support means, rotating about a central axis, for supporting said transducer in such a manner that the transducer arm tends to seek outward in response to the centrifugal force of its rotation over said data surface from said central axis with rotation of said support means, said support means being rotated to selectively position said transducer over one of said tracks to access data locations on said tracks;
a counteracting spring means for counterbalancing the outward directing centrifugal force of said rotating transducer and biasing said transducer radially inward.

21. A data storage device as claimed in claim 20 wherein said rotating support means comprise a spindle rotating on said axis, and supporting an arm carrying said transducer thereon, rotation of said spindle causing said arm to move said transducer along one of said tracks.

22. A data storage device as claimed in claim 21 including bias means for mechanically biasing said transducer support arm to position said transducer over an innermost one of said tracks.

23. A data storage device as claimed in claim 22 wherein said bias means include a spring having one end connected to said transducer support arm and another end connected to said spindle, said spring exerting force to normally draw said transducer to said inner track.

24. A data storage device as claimed in claim 23 wherein said fixed disc is adapted to physically support elements of said data storage device.

25. A data storage device as claimed in claim 24 wherein said fixed disc includes holes, said data storage device including elements supported by attachment elements fixed through said holes.

26. A data storage device as claimed in claim 25 wherein said data storage device includes a printed circuit board supported from said fixed disc.

27. A data storage device as claimed in claim 26 wherein said disc surface includes data regions and regions where servo information is stored, said device including servo means for accessing said servo data and modulating a motor drive means speed to accurately position said transducer over said disc memory surface.

* * * * *